United States Patent
Mizushi et al.

(10) Patent No.: US 10,175,722 B2
(45) Date of Patent: Jan. 8, 2019

(54) CRADLE AND TERMINAL DEVICE CONTROL METHOD

(71) Applicant: MITSUBISHI ELECTRIC CORPORATION, Tokyo (JP)

(72) Inventors: Yuki Mizushi, Tokyo (JP); Hideto Iwamoto, Tokyo (JP); Takanori Miyake, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/507,181

(22) PCT Filed: Jan. 16, 2015

(86) PCT No.: PCT/JP2015/051089
§ 371 (c)(1),
(2) Date: Feb. 27, 2017

(87) PCT Pub. No.: WO2016/113909
PCT Pub. Date: Jul. 21, 2016

(65) Prior Publication Data
US 2017/0277224 A1    Sep. 28, 2017

(51) Int. Cl.
*G06F 1/16*    (2006.01)

(52) U.S. Cl.
CPC ............ *G06F 1/1632* (2013.01); *G06F 1/166* (2013.01); *G06F 1/1607* (2013.01); *G06F 1/1628* (2013.01); *G06F 1/1635* (2013.01)

(58) Field of Classification Search
CPC .................................................. G06F 1/1632
See application file for complete search history.

(56) References Cited

U.S. PATENT DOCUMENTS 4,953,113 A * 8/1990 Chadima, Jr. ....... G06F 15/0216
235/1 D
5,644,653 A    7/1997 Sunakawa et al.
(Continued)

FOREIGN PATENT DOCUMENTS

CN    202995380 U    6/2013
CN    203191729 U    9/2013
(Continued)

*Primary Examiner* — Anthony Q Edwards
(74) *Attorney, Agent, or Firm* — Birch, Stewart, Kolasch & Birch, LLP

(57) ABSTRACT

A cradle includes a connector being connectable to a connector of a manipulation device, a terminal holding part holding the manipulation device, an attachment detection unit detecting that the manipulation device is attached to the terminal holding part, a release detection unit detecting a release instruction to release manipulation acceptance prohibition of the manipulation device. The cradle further includes an operation control unit making, when the attachment detection unit detects the attachment of the manipulation device, the manipulation device prohibit manipulation acceptance in response to establishment of connection between the connectors, and when the release detection unit detects the release instruction, making the manipulation device release the prohibition of the manipulation acceptance such that the operation control unit accepts manipulation information for controlling an automated system from the manipulation device, and a manipulation instruction unit notifying the automated system of the manipulation information accepted by the operation control unit.

9 Claims, 8 Drawing Sheets

(56) References Cited

U.S. PATENT DOCUMENTS

| | | | | |
|---|---|---|---|---|
| 5,801,918 A * | 9/1998 | Ahearn | G06K 7/10881 | 235/472.01 |
| 6,114,779 A * | 9/2000 | Nishionji | H01H 9/0214 | 307/140 |
| 6,937,464 B2 * | 8/2005 | Adams | G06F 1/1626 | 235/472.01 |
| 7,147,163 B2 * | 12/2006 | Salvato | G06F 1/1632 | 235/472.02 |
| 7,428,143 B1 * | 9/2008 | Jones | G06F 1/1632 | 224/929 |
| 7,440,770 B2 * | 10/2008 | Miyashita | G06F 1/1615 | 345/163 |
| 7,634,606 B2 * | 12/2009 | Kimchi | G01S 19/35 | 700/66 |
| 8,740,270 B1 * | 6/2014 | Mizell | A45F 5/00 | 224/217 |
| 8,783,574 B2 * | 7/2014 | Kumar | G06F 1/1632 | 235/462.43 |
| 8,972,617 B2 * | 3/2015 | Hirschman | G06F 3/0219 | 463/37 |
| 9,198,307 B1 * | 11/2015 | Lacy | A45F 5/00 | |
| 9,329,628 B2 * | 5/2016 | McGowan | G06F 1/1626 | |
| 9,753,493 B2 * | 9/2017 | Prejer | H02J 7/0042 | |
| 2002/0009194 A1 * | 1/2002 | Wong | H04M 1/04 | 379/449 |
| 2003/0213822 A1 * | 11/2003 | Lautner | A44C 5/0007 | 224/221 |
| 2003/0222150 A1 * | 12/2003 | Sato | G06F 1/1626 | 235/472.02 |
| 2004/0092367 A1 | 5/2004 | Corbalis et al. | | |
| 2004/0166896 A1 * | 8/2004 | Salvato | G06F 1/1632 | 455/556.2 |
| 2006/0161711 A1 * | 7/2006 | Inoue | G06F 1/1613 | 710/301 |
| 2007/0113098 A1 * | 5/2007 | Croley | G06F 1/1626 | 713/186 |
| 2008/0253079 A1 * | 10/2008 | Robinson | G06F 1/1632 | 361/679.3 |
| 2010/0081505 A1 * | 4/2010 | Alten | G06F 1/1632 | 463/36 |
| 2011/0240448 A1 * | 10/2011 | Springer | F16M 11/041 | 200/331 |
| 2011/0249394 A1 * | 10/2011 | Nielsen | G06F 1/1632 | 361/679.41 |
| 2012/0019016 A1 * | 1/2012 | Brisbin | A45F 5/00 | 294/137 |
| 2012/0068832 A1 * | 3/2012 | Feldstein | F16M 11/041 | 340/12.5 |
| 2012/0162891 A1 * | 6/2012 | Tranchina | B60R 11/0252 | 361/679.26 |
| 2013/0005401 A1 * | 1/2013 | Rosenhan | G06F 1/1626 | 455/557 |
| 2013/0052956 A1 * | 2/2013 | McKell | H04R 1/02 | 455/41.2 |
| 2013/0311689 A1 | 11/2013 | Kennedy | | |
| 2014/0099995 A1 | 4/2014 | Yashiki et al. | | |
| 2014/0146085 A1 | 5/2014 | Takeda | | |
| 2014/0217905 A1 | 8/2014 | Clayton et al. | | |
| 2015/0227134 A1 * | 8/2015 | Yanagidaira | G05B 19/409 | 345/173 |
| 2016/0041931 A1 * | 2/2016 | Gupta | G06F 9/4856 | 710/8 |
| 2017/0170670 A1 * | 6/2017 | Shimura | H02J 7/0021 | |

FOREIGN PATENT DOCUMENTS

| | | |
|---|---|---|
| CN | 103609092 A | 2/2014 |
| CN | 104035353 A | 9/2014 |
| JP | 7-20991 A | 1/1995 |
| JP | 11-119822 A | 4/1999 |
| JP | 2002-99310 A | 4/2002 |
| JP | 2013-105301 A | 5/2013 |
| JP | 2013-239980 A | 11/2013 |
| JP | 2014-36875 A | 2/2014 |
| JP | 2014-106848 A | 6/2014 |
| WO | WO 01/29731 A1 | 4/2001 |
| WO | WO 2014/057854 A1 | 4/2014 |

* cited by examiner

CRADLE AND TERMINAL DEVICE CONTROL METHOD

TECHNICAL FIELD

The invention relates to a cradle to which a terminal device such as a tablet computer that monitors and controls a system is attached, and a terminal device control method using the cradle.

BACKGROUND ART

It is known that, in a recent communication system using industrial equipment, monitoring and controlling of the system are performed not by a dedicated manipulation panel but by a terminal device such as a tablet computer. In addition, there is known a communication system for improving operability using a tablet computer that realizes an intuitive manipulation.

For example, Patent Literature 1 discloses a technique related to the monitoring and controlling of a system using a tablet computer is disclosed. In this technique, equipment conditions of a machine tool transferred from a communication interface (I/F) via a CPU are displayed on a display of the tablet computer as a control panel screen, and the content of control circuit data of a PLC transferred from the communication I/F via the CPU is displayed on the display thereof as a monitoring screen.

In addition, for example, Patent Literature 2 discloses a technique for an industrial equipment control system that allows a tablet computer to access data accumulated in a server via a wireless communication signal transmitter, and transmit an operation command to each of a plurality of programmable controllers.

Further, there is known a technique for performing a manipulation of a tablet computer by using a dedicated hardware manipulation system.

For example, in Patent Literature 3, it is disclosed that a cradle as an accommodation unit is provided, and electronic equipment is accommodated in the cradle.

Furthermore, for example, Patent Literature 4 discloses a technique regarding information processing equipment that includes information processing equipment main body and detachable slave equipment having a network I/F and the like.

Additionally, for example, Patent Literature 5 discloses a technique of a cradle detachably provided to a portable device.

CITATION LIST

Patent Literature

Patent Literature 1: Japanese Patent Application Laid-open No. 2002-99310
Patent Literature 2: Japanese Patent Application Laid-open No. 2013-105301
Patent Literature 3: Japanese Patent Application Laid-open No. 2014-106848
Patent Literature 4: Japanese Patent Application Laid-open No. H7-20991 (1995-20991)
Patent Literature 5: Japanese Patent Application Laid-open No. 2014-36875

SUMMARY OF INVENTION

Technical Problem

In industrial sites, high reliability in communication is required. In this regard, the technique disclosed in each of Patent Literature 1 and 2 has a problem that, though the operability is improved by using the tablet computer, reliability in wireless communication is decreased due to the architectural structure of the production site and effects of various devices. In addition, in the tablet computer, since a manipulation on a touch panel is used, a problem arises in that a careless manipulation may be performed or a malfunction may occur.

Further, in the industrial sites, a problem arises in that it is difficult for an operator to hold the tablet computer with an oily hand or a gloved hand so that a dedicated hardware manipulation system is required.

In this regard, each of Patent Literatures 3 to 5 discloses a technique in which a cradle is attached to electronic equipment. Patent Literature 5 discloses that the cradle is made easier to hold, and that the cradle is used as a dedicated hardware manipulation system. However, in these techniques, the possibility of occurrence of a malfunction by a careless manipulation on a touch panel is not concerned enough.

The invention has been made in order to solve the above problems, and an object thereof is to provide a cradle that is attached to a terminal device and is capable of performing communication with high reliability and preventing a careless manipulation and a malfunction, and a terminal device control method in which the cradle is used.

Solution to Problem

A cradle according to the invention is a cradle used with a terminal device by being connected to the terminal device via a connector provided in the terminal device, and the cradle includes: a connector being connectable to the connector provided in the terminal device; a terminal holding part for holding the terminal device; an attachment detection unit for detecting that the terminal device is attached to the terminal holding part; a release detection unit for detecting a release instruction to release manipulation acceptance prohibition of the terminal device; an operation control unit for making, when the attachment detection unit detects the attachment of the terminal device, the terminal device prohibit manipulation acceptance in response to establishment of connection between the connector of the cradle and the connector provided in the terminal device, and when the release detection unit detects the release instruction, making the terminal device release the prohibition of the manipulation acceptance such that the operation control unit accepts manipulation information for controlling an automated system from the terminal device; and a manipulation instruction unit for notifying the automated system of the manipulation information accepted by the operation control unit.

Advantageous Effects of Invention

According to the present invention, it is possible to provide a cradle capable of performing communication with high reliability and preventing a careless manipulation and a malfunction, and a terminal device control method that uses the cradle.

DESCRIPTION OF EMBODIMENTS

In the following, some embodiments of the present invention will be described in detail with reference to the accompanying drawings.

Embodiment 1

Figure 1:
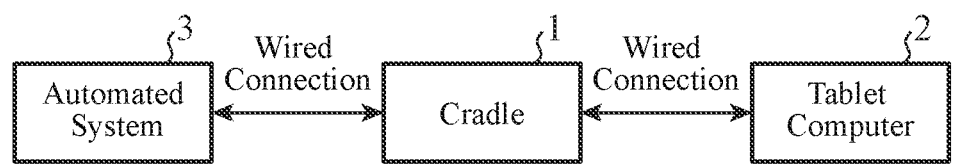
FIG. 1 is a view for explaining an outline of a system control by a tablet computer (terminal device) attached to a cradle according to an Embodiment 1 of the present invention.

FIG. 1 is a view for explaining an outline of system control by a tablet computer 2 (terminal device) attached to a cradle 1 according to an Embodiment 1 of the present invention.

The tablet computer 2 is attached to the cradle 1 according to the Embodiment 1 and, as shown in FIG. 1, the cradle 1 is used by being connected between the tablet computer 2 and an automated system 3 such as an NC, equipment, or a robot.

In the Embodiment 1, the tablet computer 2 is attached to the cradle 1, and is used as a terminal device of a Numerical Control (NC) for controlling an electric discharge machine, a laser beam machine, a machining center, a lathe, or the like. In addition, the tablet computer 2 may also be used as a terminal device of an automated manufacturing facility or an automated building management system. Further, the tablet computer 2 can also be used as a terminal device that teaches a robot motions. Note that, a commercially available device can be used as the tablet computer 2.

An operator controls the automated system 3 by manipulating the tablet computer 2 via the cradle 1.

In the Embodiment 1, the cradle 1 and the tablet computer 2 are connected by wired connection, and the cradle 1 and various machines of the automated system 3 are connected by wired connection. Thus, by connecting the cradle 1 and the automated system 3 by the wired connection, it is possible to secure communication reliability.

Figure 2:
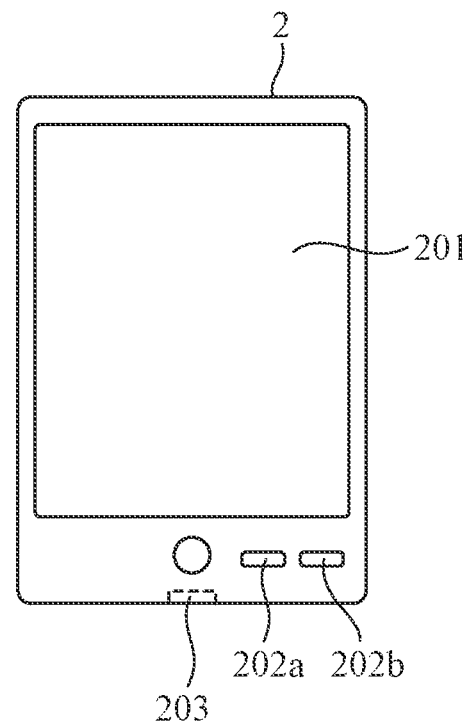
FIG. 2 is a view showing an outer appearance of the tablet computer according to the Embodiment 1 of the present invention.

FIG. 2 is a view showing an outer appearance of the tablet computer 2 according to the Embodiment 1 of the present invention.

A commercially available tablet computer can be used as the tablet computer 2. The tablet computer 2 may include a speaker 202a and a microphone 202b (here, the speaker 202a and the microphone 202b are referred to as an input/output unit 202).

In the tablet computer 2, a plurality of applications for controlling the automated system 3 is mounted.

A display unit 201 of the tablet computer 2 is a touch panel display that is used for display of various information items such as icons of applications, and various manipulations such as selection and execution of applications.

Note that a USB connector 203 is provided in the lower part of the tablet computer 2. Tablet computer 2 and the cradle 1 are electrically and physically coupled to each other by connecting a USB connector 121 (the detail thereof will be described later) provided at the tip of a connection cable 12 of the cradle 1 to the USB connector 203.

Figure 3:
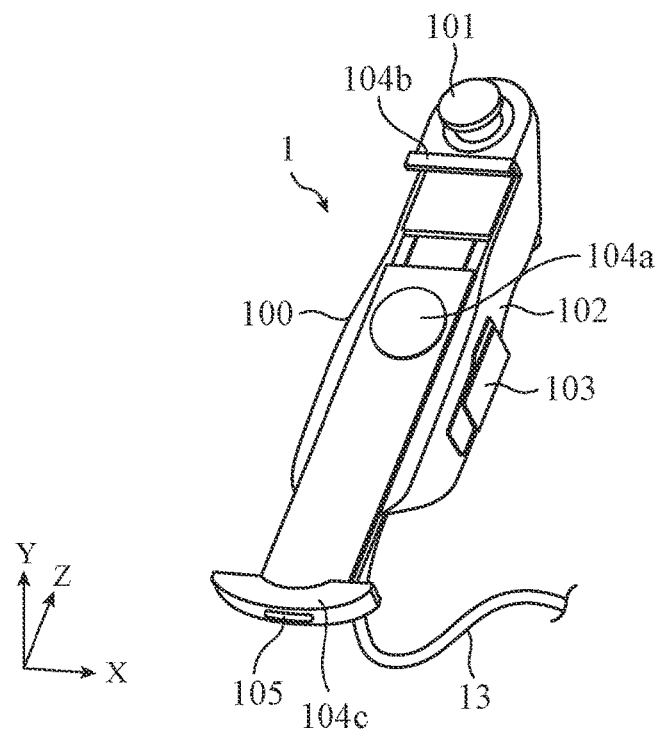
FIG. 3 is a view showing an outer appearance of the cradle according to the Embodiment 1 of the present invention.

FIG. 3 is a view showing an outer appearance of the cradle 1 according to the Embodiment 1 of the present invention.

The cradle 1 has a housing 100 that is formed by, e.g., plastic molding.

The housing 100 has a substantially rectangular parallelepiped shape in which the direction (Z-axis direction) connecting the front and the rear thereof is the longitudinal direction, and the entire housing 100 has a size that allows an adult to hold the housing 100 by his/her single hand. As an example, the housing 100 has a size about the same as the length or width of a human palm.

The housing 100 of the cradle 1 is provided with an emergency stop switch 101, a grip 102, and an enabling switch 103. In addition, the cradle 1 is provided with a terminal holding part 104 that includes aback surface supporting part 104a that supports the tablet computer 2 from its back surface side, an upper bottom fixing part 104b that fixes the upper bottom of the tablet computer 2 from its upper side, and a lower bottom supporting part 104c that supports the lower bottom of the tablet computer 2 from its lower side. The tip of the terminal holding part 104, i.e., the lower bottom supporting part 104c is provided so as to protrude beyond the lower tip of the housing 100.

In addition, the lower bottom supporting part 104c is provided with a hole 105 through which the connection cable 12 for connection to the tablet computer 2 is passed when the tablet computer 2 is attached (a state in which the cradle 1 and the tablet computer 2 are connected to each other will be described later with reference to FIG. 5).

The emergency stop switch 101 is provided for stopping a machine of the automated system 3 being a control target.

The grip 102 is provided for an operator to hold the cradle 1.

The enabling switch 103 is provided for permitting a manipulation of the tablet computer 2 when the tablet computer 2 is attached to the cradle 1. The operator can perform a manipulation of the tablet computer 2 by pressing the enabling switch 103.

Figure 4:
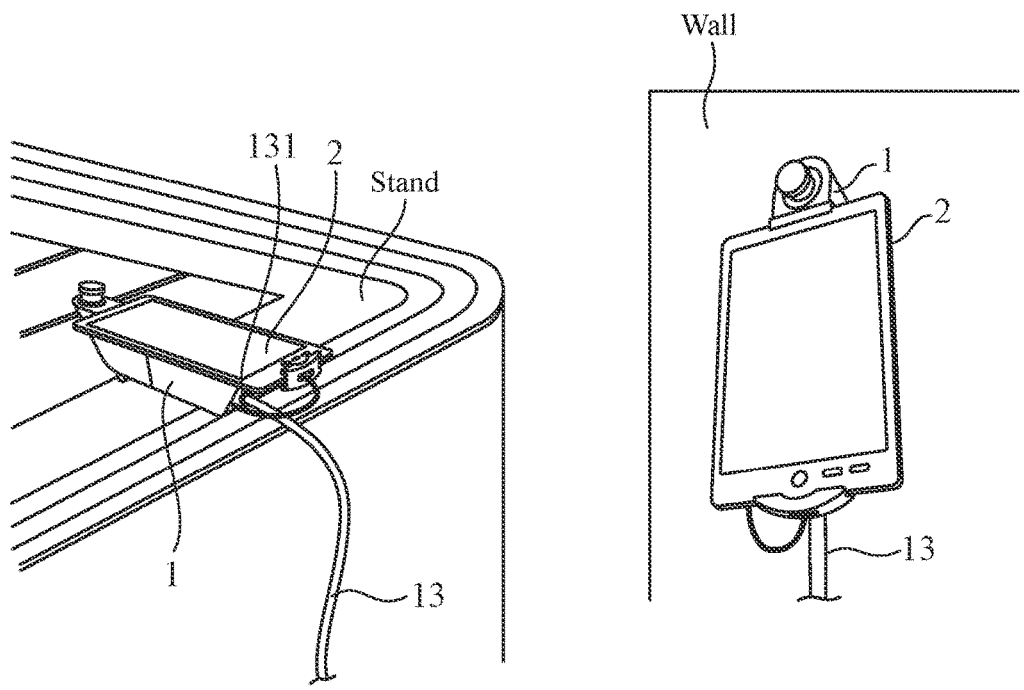
FIG. 4 is a view for explaining a cable arrangement that does not hinder a manipulation display.

In addition, as shown in FIG. 4, the cradle 1 is provided with a connector 131, a connection cable 13 is connected to the connector 131, and the other end of the connection cable 13 is connected to the automated system 3. The connector 131 for the connection cable 13 that connects the cradle 1 and the automated system 3 is provided at the end of the cradle 1 closer to the operator, i.e., at the lower tip of the housing 100. Due to such a configuration, the center of gravity is positioned near the side of the operator, and a stable manipulation is allowed without applying an additional load to the operator. In addition, in a case where the cradle 1 is temporarily placed or installed on a stand or a wall, it is possible to prevent the connection cable 13 from overlapping the manipulation display.

Figure 5:
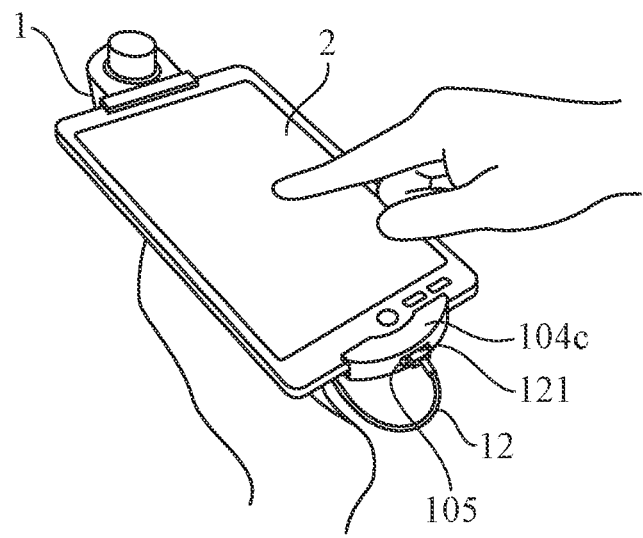
FIG. 5 is a view showing a state in which the tablet computer is attached to the cradle, and the cradle is held by an operator.

FIG. 5 is a view showing a state in which the tablet computer 2 is attached to the cradle 1, and the cradle 1 is held by the operator.

The back surface of the tablet computer 2 is held by the terminal supporting part 104 such that it is supported by the back surface supporting part 104a, the upper bottom thereof is fixed by the upper bottom fixing part 104b, the lower bottom thereof is supported by the lower bottom supporting part 104c, and the operator can see the display unit 201.

As shown in FIG. 5, the connection cable 12 provided in the cradle 1 is passed through the hole 105 of the lower bottom supporting part 104c, the USB connector 121 provided at the tip of the connection cable 12 is connected to the USB connector 203 (see FIG. 2) provided in the lower part of the tablet computer 2, and the tablet computer 2 and the cradle 1 are thereby coupled to each other electrically and physically. Note that the connection cable 12 has a connector at the end of the side opposite to the side on which the USB connector 121 is provided, and is electrically coupled to the cradle 1 via the connector.

The electric power of the cradle 1 is supplied from a machine of the automated system 3 to which the cradle 1 is connected via a connector 303 (that will be described later with reference to FIG. 8) of the machine, the connection cable 13, and the connector 131 of the cradle 1. The electric power is also supplied to the tablet computer 2 from the cradle 1 via the USB connector 121 (that will be described later with reference to FIG. 8) and the USB connector 203.

The housing 100 of the cradle 1 may be provided with a power button (not shown). In such a case, when the power button is turned ON by the operator, the power is supplied via an AC adaptor that is not shown, and a power supply state is established.

The cross-sectional shape of the grip 102 is assumed to be a square of 50 mm×50 mm basically. The grip 102 with this shape fits a hand of the operator, is easy to hold, and the operator can tightly hold the grip 102. However, as long as the shape fits the hand of the operator and the shape allows the operator to easily hold the grip 102, the shape of the grip 102 is not limited to the shape described above.

Figure 6:
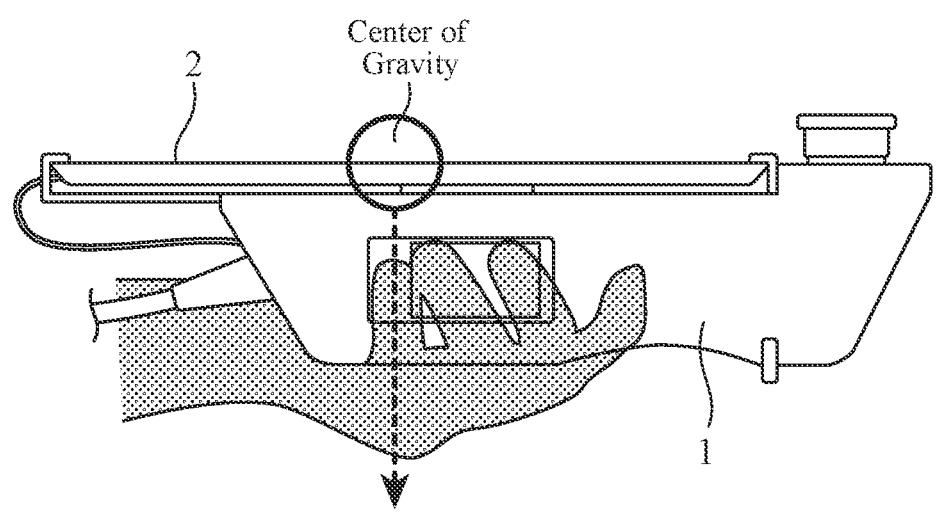
FIG. 6 is a view for explaining the length of a grip of the cradle.

The length of the grip 102 is determined as follows: the tablet computer 2 is fixed to the cradle 1 such that, when the grip 102 of the cradle 1 to which the tablet computer 2 is attached is gripped in a state where the tablet computer 2 is held horizontally, the center of gravity of the tablet computer 2 is aligned in the vertical direction with the center of the palm of the operator who grips the grip 102 (see FIG. 6). Note that the center of the palm of the operator who grips the grip 102 may be any position in the vicinity of the center. With this, even when the operator holds the cradle 1 to which the tablet computer 2 is attached for a long period of time, the hand of the operator doesn't get tired. In addition, by fixing the tablet computer 2 to the cradle 1 such that the center of gravity of the tablet computer 2 is aligned in the vertical direction with the vicinity of the palm of the operator, it is possible to reduce the burden of weight by the tablet computer 2 that is felt by the operator.

Note that, although not shown in the drawing, the grip 102 may also be provided with a hand belt such that the tablet computer 2 attached to the cradle 1 does not fall even when the operator does not keep gripping the grip 102.

Figure 7:
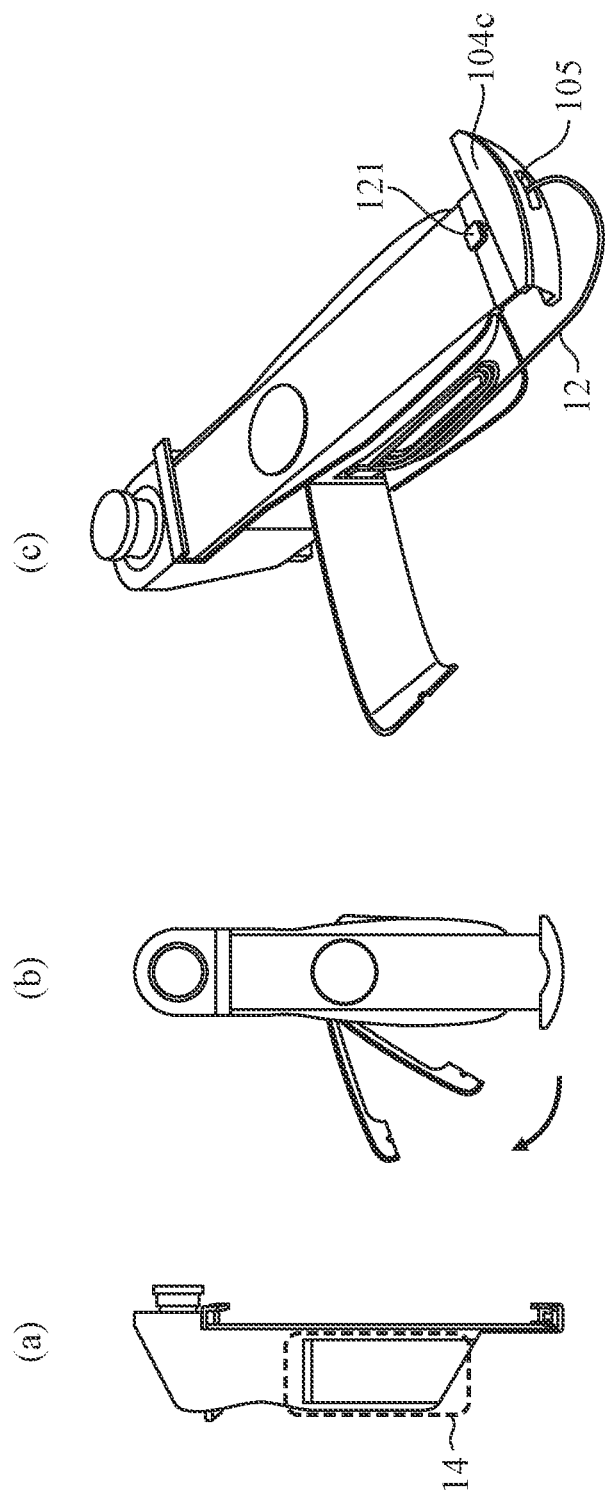
FIGS. 7(a) to 7(c) are views for explaining a space for accommodating a connection cable.

In addition, a space 14 for accommodating the connection cable 12 is provided in the cradle 1 such that the connection cable 12 of the cradle 1 for coupling the cradle 1 to the tablet computer 2 does not hinder the manipulation of the tablet computer 2 (see FIGS. 7(a) and 7(c)).

Note that, in FIGS. 7(a) to 7(c), though a lid of the space 14 is provided on the left side surface of the cradle 1, and the lid is opened and closed from below (see FIG. 7(b)), the space 14 for accommodating the connection cable 12 in the cradle 1 may be any configuration and is not limited to the configuration shown in FIGS. 7A to 7C.

In the following, the internal structure and function of each of the tablet computer 2 and the cradle 1 will be described with reference to FIG. 8.

Figure 8:
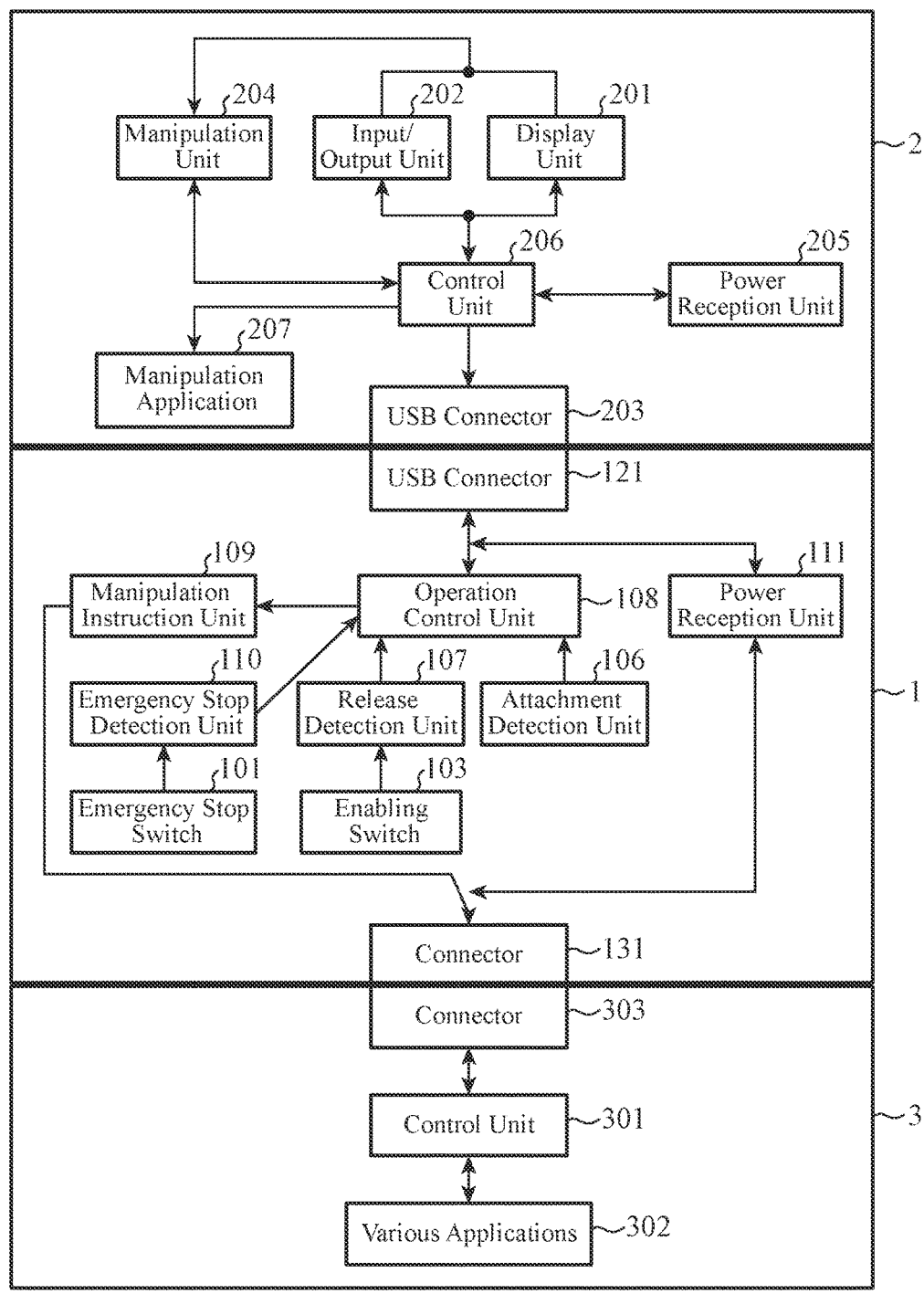
FIG. 8 is a view showing an example of an electrical configuration when the tablet computer and the cradle are connected via USB connectors, and the cradle and an automated system are connected via connectors in the Embodiment 1.

FIG. 8 is a view showing an example of an electrical configuration when the tablet computer 2 and the cradle 1 are connected via the USB connectors 203 and 121, and the cradle 1 and the automated system 3 are connected via the connectors 131 and 303 in the Embodiment 1.

The tablet computer 2 includes the USB connector 203, the display unit 201, the input/output unit 202, a manipulation unit 204, a power reception unit 205, a control unit 206, and a manipulation application 207.

The display unit 201 is a touch panel display that performs display of various information items and with which the operator performs various manipulations and settings.

The input/output unit 202 outputs sounds such as reproduced music and telephone conversation voice in accordance with the execution of an application mounted on the tablet computer 2. In addition, the operator can issue a manipulation instruction by voice from the input/output unit 202. Note that, herein, it is assumed that the tablet computer 2 includes the input/output unit 202, but the tablet computer 2 may not include the input/output unit 202.

The manipulation unit 204 accepts the manipulation input by the operator from the display unit 201 or the input/output unit 202. The manipulation information accepted by the manipulation unit 204 is transmitted to the control unit 206, and is transmitted from the control unit 206 to the cradle 1 via the USB connector 203.

The power reception unit 205 receives power supply from the cradle 1 via the USB connector 203.

The control unit 206 controls the tablet computer 2. For example, the control unit 206 transmits the manipulation information accepted by the manipulation unit 204 to the cradle 1 via the USB connector 203, and controls the operation of the manipulation application 207 mounted on the tablet computer 2.

The manipulation application 207 has a function to operate the tablet computer 2.

The cradle 1 includes the USB connector 121, the connector 131, the enabling switch 103, an attachment detection unit 106, a release detection unit 107, an operation control unit 108, a manipulation instruction unit 109, an emergency stop detection unit 110, a power reception unit 111, and the emergency stop switch 101.

The cradle 1 is electrically connected to a machine of the automated system 3 that is controlled by the tablet computer 2 via the connectors 131 and 303.

The power reception unit 111 receives the power supply from the machine of the automated system 3 to which the cradle 1 is connected via the connector 303 of the machine of the automated system 3, the connection cable 13 (see FIG. 3), and the connector 131. The power supplied to the power reception unit 111 is also supplied to the tablet computer 2 via the USB connector 121 and the USB connector 203.

The enabling switch 103 is provided for permitting the manipulation of the tablet computer 2 when the tablet computer 2 is attached to the cradle 1.

The attachment detection unit 106 detects the attachment of the tablet computer 2 to the terminal holding part 104 (see FIG. 3). For example, a sensor is provided in the terminal holding part 104, and the attachment detection unit 106 determines that the tablet computer 2 is attached to the terminal holding part 104 in accordance with the detection of the tablet computer 2 by the sensor.

In addition, the attachment detection unit 106 can also detect detachment of the tablet computer 2 from the terminal holding part 104. For example, a sensor is provided in the terminal holding part 104, and the attachment detection unit 106 determines that the tablet computer 2 is detached from the terminal holding part 104 in accordance with the detection that the sensor does not detect the tablet computer 2.

When the attachment detection unit 106 detects that the tablet computer 2 is attached to the cradle 1, the operation control unit 108 transmits a manipulation restriction instruction signal, which makes the display unit 201 prohibit acceptance of a manipulation by the operator, to the control unit 206 of the tablet computer 2 via the USB connectors 121 and 203 in response to the establishment of the connection to the tablet computer 2 resulting from the connection between the USB connector 121 and the USB connector 203 to thereby make the control unit 206 prohibit a touch panel manipulation. At this point, the operation control unit 108 may transmit the manipulation restriction instruction signal that makes the display unit 201 display a message indicating that the manipulation is prohibited to the control unit 206. Similarly, the operation control unit 108 transmits the manipulation restriction instruction signal that makes the input/output unit 202 prohibit the manipulation acceptance to the control unit 206. At this point, the operation control unit 108 may transmit an instruction signal that makes the input/output unit 202 output a sound indicating that the manipulation is prohibited to the control unit 206. The control unit 206 performs control corresponding to the manipulation restriction instruction signal received from the operation control unit 108.

When the operation control unit 108 receives a release acceptance signal from the release detection unit 107, the operation control unit 108 transmits a manipulation restriction release signal that makes the display unit 201 release the prohibition of the acceptance of the manipulation by the operator to the control unit 206 of the tablet computer 2 via the USB connectors 121 and 203 to thereby make the control unit 206 release the prohibition of the touch panel manipulation. That is, the touch panel manipulation by the operator is permitted. At this point, the operation control unit 108 may transmit the manipulation restriction release signal that makes the display unit 201 display a message indicating that the manipulation prohibition is released to the control unit 206. Similarly, the operation control unit 108 transmits the manipulation restriction release signal that makes the input/output unit 202 release the prohibition of the manipulation acceptance to the control unit 206. At this point, the operation control unit 108 may transmit the manipulation restriction release signal that makes the input/output unit 202 output a sound indicating that the manipulation prohibition is released to the control unit 206. The control unit 206 performs control corresponding to the manipulation restriction release signal received from the operation control unit 108.

The operation control unit 108 accepts the manipulation information from the manipulation unit 204 of the tablet computer 2 in which the prohibition of the manipulation acceptance has been released via the control unit 206 and the USB connectors 203 and 121.

In addition, it is possible to design the operation control unit 108 as follows: when the operation control unit 108 receives an emergency stop notification from the emergency stop detection unit 110, the operation control unit 108 makes the control unit 206 of the tablet computer 2 display a message indicating that the machine of the automated system 3 is in the emergency stop on the display unit 201 via the USB connectors 121 and 203. Further, the operation control unit 108 may be designed such that it makes the control unit 206 output a sound indicating that the machine of the automated system 3 is in the emergency stop by the input/output unit 202.

The release detection unit 107 detects a release instruction of the manipulation prohibition of the tablet computer 2 which is issued in accordance with the pressing of the enabling switch 103 by the operator. Subsequently, the release detection unit 107 transmits a release instruction signal to the operation control unit 108.

The manipulation instruction unit 109 receives the manipulation information accepted by the operation control unit 108 from the manipulation unit 204 of the tablet computer 2 via the control unit 206 and the USB connectors 203 and 121, and notifies a control unit 301 of the machine of the automated system 3 of the manipulation information via the connector 131 and the connector 303 of the automated system 3. The control unit 301 of the machine of the automated system 3 performs control of various applications 302 in accordance with the manipulation information obtained by the notification.

Note that the manipulation application 207 is pre-installed in the tablet computer 2. The manipulation application 207 communicates manipulation information with the various applications 302 of the automated system 3, and allows the manipulation of the automated system 3 from the tablet computer 2. The manipulation information includes ON/OFF of the automated system 3, adjustment of each of parameters, switching of operation modes, or the like.

The emergency stop detection unit 110 detects the issue of the emergency stop instruction that stops the machine of the automated system 3 in accordance with the pressing of the emergency stop switch 101 by the operator. When the emergency stop detection unit 110 detects the instruction, the emergency stop detection unit 110 notifies the operation control unit 108 that the emergency stop instruction, which instructs the machine of the automated system 3 to forcibly stop, is issued.

Figure 9:
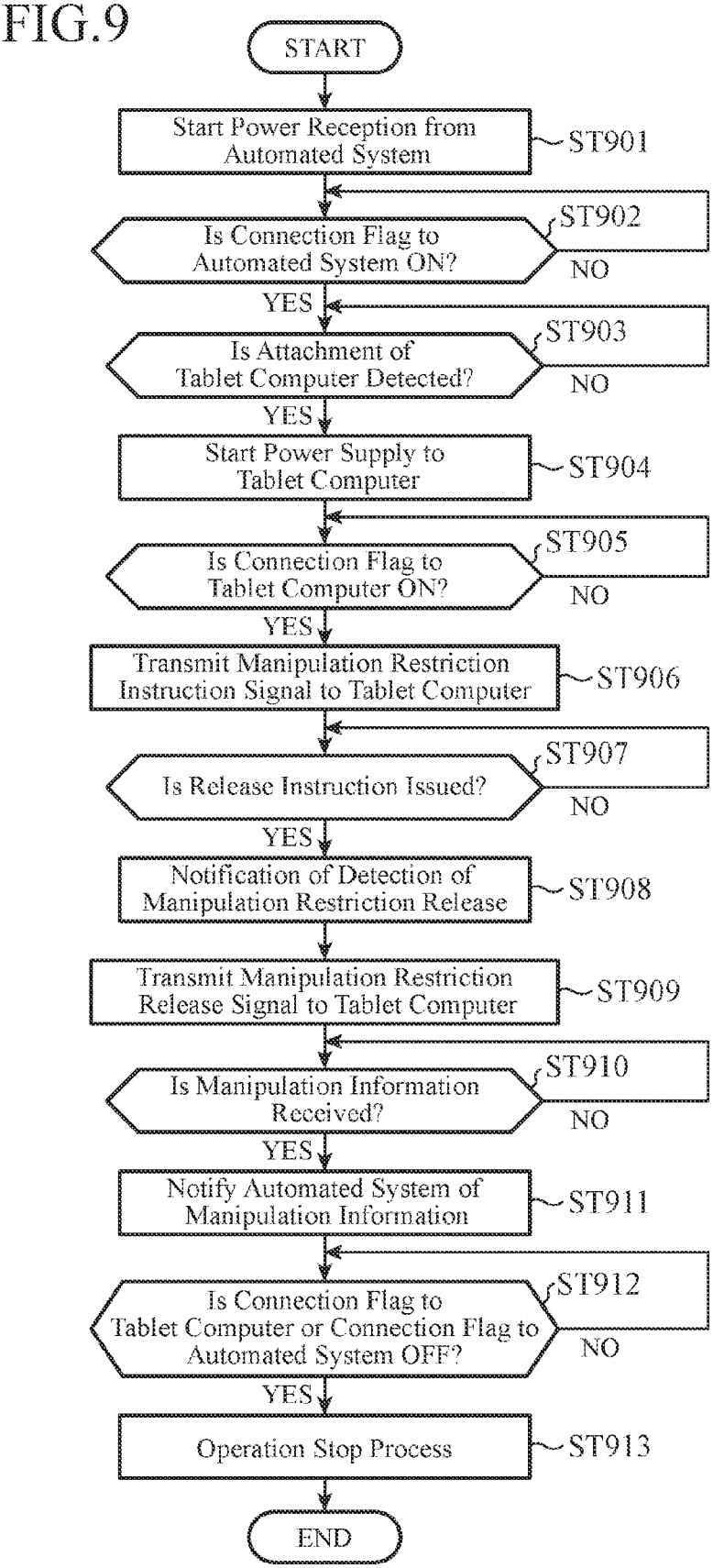
FIG. 9 is a flowchart for explaining an operation of the cradle according to the Embodiment 1 of the present invention.

FIG. 9 is a flowchart for explaining the operation of the cradle 1 according to the Embodiment 1 of the present invention.

The power reception unit 111 starts the reception of the power from the automated system 3 via the connector 303 of the machine of the automated system 3 and the connector 131 (Step ST901). When the power supply to the power reception unit 111 is started and the power of the cradle 1 is turned on, initialization is performed and the power is supplied to the cradle 1 from the machine of the automated system 3. Note that the initialization is an initial setting process at power-on of the cradle 1, and is the process that makes the cradle 1 usable.

The power reception unit 111 determines whether or not a connection flag to the automated system 3 is ON (Step ST902). The cradle 1 and the machine of the automated system 3 to be controlled by the operator are electrically coupled to each other by being connected with the connection cable 13. When the connector 303 of the machine of the automated system 3 and the connector 131 of the cradle 1 are connected and the power is supplied to the cradle 1, the connection flag to the automated system 3 internally held by the cradle 1 is turned ON. Thus, in Step ST902, the power reception unit 111 determines whether or not the automated system 3 and the cradle 1 are electrically coupled to each other and the power is supplied by determining whether or not the connection flag to the automated system 3 is turned ON.

In the case where it is determined that the connection flag to the automated system 3 is not ON in Step ST902 (in the case of "NO" in Step ST902), the process in Step ST902 is repeated. That is, the power reception unit 111 waits until the connector 303 of the machine of the automated system 3 and the connector 131 of the cradle 1 are connected and electrically coupled so that the power is supplied to the cradle 1.

In the case where it is determined that the connection flag to the automated system 3 is ON in Step ST902 (in the case of "YES" in Step ST902), the attachment detection unit 106 detects whether or not the tablet computer 2 is attached to the terminal holding part 104 (Step ST903). Specifically, for example, a sensor is provided in the terminal holding part 104, and the attachment detection unit 106 determines that the tablet computer 2 is attached to the terminal holding part 104 in accordance with the detection of the tablet computer 2 by the sensor.

In the case where the tablet computer 2 is not attached to the terminal holding part 104 in Step ST903 (in the case of "NO" in Step ST903), the process in Step ST903 is repeated. That is, the attachment detection unit 106 waits until the tablet computer 2 is attached to the terminal holding part 104.

In the case where the tablet computer 2 is attached to the terminal holding part 104 in Step ST903 (in the case of "YES" in Step ST903), the power reception unit 111 starts the power supply to the power reception unit 205 of the tablet computer 2 via the USB connector 121 and the USB connector 203 of the tablet computer 2 (Step ST904). When the power supply to the power reception unit 205 is started and the power of the tablet computer 2 is turned on, the initialization of and the power supply to the tablet computer 2 from the cradle 1 are subsequently performed.

The power reception unit 111 determines whether or not the connection flag to the tablet computer 2 is ON (Step ST905). The cradle 1 and the tablet computer 2 are electrically and physically coupled to each other by being connected with the connection cable 12, and the power is supplied to the tablet computer 2. When the USB connector 203 of the tablet computer 2 and the USB connector 121 of the cradle 1 are connected, the connection flag to the tablet computer 2 internally held by the cradle 1 is turned ON, and the power supply to the tablet computer 2 is started. Accordingly, in Step ST905, the power reception unit 111 determines whether or not the tablet computer 2 and the cradle 1 are electrically coupled to each other and the power is supplied to the tablet computer 2 by determining whether or not the connection flag to the tablet computer 2 is ON.

In the case where it is determined that the connection flag to the tablet computer 2 is not ON in Step ST905 (in the case of "NO" in Step ST905), the process in Step ST905 is repeated. That is, the power reception unit 111 waits until the USB connector 203 of the tablet computer 2 and the USB connector 121 of the cradle 1 are connected and electrically coupled, and the power is supplied to the tablet computer 2.

In the case where it is determined that the connection flag to the tablet computer 2 is ON in Step ST905 (in the case of "YES" in Step ST905), the operation control unit 108 transmits the manipulation restriction instruction signal that makes the display unit 201 restrict the touch panel manipulation, i.e., prohibit the acceptance of the manipulation by the operator to the control unit 206 of the tablet computer 2 via the USB connectors 121 and 203 (Step ST906).

The control unit 206 of the tablet computer 2 receives the manipulation restriction instruction signal, and performs the control of the screen that prohibits the acceptance of the manipulation on the display unit 201 by the operator.

Note that, at this point, in the case where the tablet computer 2 has the input/output unit 202, the operation control unit 108 transmits the manipulation restriction instruction signal that makes the input/output unit 202 prohibit voice input or the like to the control unit 206.

In addition, at this point, the operation control unit 108 may be designed to make the control unit 206 display a message indicating that the manipulation is prohibited on the display unit 201, and also make the control unit 206 output a sound indicating that the manipulation is prohibited from the input/output unit 202.

The release detection unit 107 detects whether or not the release instruction of the prohibition of the acceptance of the manipulation by the operator is issued (Step ST907). The enabling switch 103 is provided for the permission of the manipulation of the tablet computer 2. Namely, the operator can release the prohibition of the manipulation acceptance in the tablet computer 2 by pressing the enabling switch 103. In Step ST907, the release detection unit 107 detects whether or not the enabling switch 103 is pressed to thereby determine whether or not the release instruction of the prohibition of the manipulation acceptance is issued.

In the case where it is determined that the release instruction of the prohibition of the acceptance of the manipulation by the operator is not issued in Step ST907 (in the case of "NO" in Step ST907), the process in Step ST907 is repeated. That is, the release detection unit 107 waits until the release instruction of the prohibition of the acceptance of the manipulation by the operator is issued. Note that, during the waiting period, the touch panel manipulation of the display unit 201 of the tablet computer 2 is kept to be restricted. That is, the manipulation acceptance of the tablet computer 2 is kept to be prohibited.

In the case where it is determined that the release instruction of the prohibition of the acceptance of the manipulation by the operator is issued in Step ST907 (in the case of "YES" in Step ST907), the release detection unit 107 notifies the operation control unit 108 of the detection of the release instruction of the prohibition of the manipulation acceptance (Step ST908).

Specifically, for example, a manipulation restriction flag is held inside the cradle 1, and the manipulation restriction flag is turned ON when the operation control unit 108 transmits the manipulation restriction instruction signal to the control unit 206 of the tablet computer 2 (Step ST906). In the case where the release detection unit 107 detects the pressing of the enabling switch by the operator (Step ST907), the release detection unit 107 notifies the operation control unit 108 of the detection of the release instruction of the prohibition of the manipulation acceptance by turning OFF the manipulation restriction flag (Step ST908).

When the manipulation restriction flag is turned OFF in Step ST908, the operation control unit 108 transmits the manipulation restriction release signal that makes the display unit 201 release the restriction of the touch panel manipulation, i.e., permit the acceptance of the manipulation by the operator to the control unit 206 of the tablet computer 2 via the USB connectors 121 and 203 (Step ST909).

The control unit 206 of the tablet computer 2 receives the manipulation restriction release signal, and performs the control of the screen that permits the acceptance of the manipulation on the display unit 201 by the operator.

With this, the manipulation of the tablet computer 2 is allowed, and it becomes possible for the operator to perform the manipulation for controlling the automated system 3 from the display unit of the tablet computer 2.

Note that, in the case where the tablet computer 2 has the input/output unit 202 and the manipulation restriction instruction signal for making the input/output unit 202 prohibit the voice input or the like was also transmitted, the operation control unit 108 transmits the manipulation restriction release signal to the control unit 206 for controlling also the input/output unit 202. With this, it becomes possible for the operator to perform the manipulation for controlling the automated system 3 also from the input/output unit 202 of the tablet computer 2.

In addition, at this point, the operation control unit 108 may be designed to make the control unit 206 perform control of the display unit 201 to display a message indicating that the prohibition of the manipulation is released, and also make the control unit 206 perform control of the input/output unit 202 to output a sound indicating that the prohibition of the manipulation is released.

The operation control unit 108 determines whether or not the operation control unit 108 has received the manipulation information from the manipulation unit 204 of the tablet computer 2 via the USB connectors 121 and 203 and the control unit 206 of the tablet computer 2 (Step ST910).

When the manipulation of the tablet computer 2 by the operator is allowed as the result of Step ST909, the operator performs the manipulation for controlling the automated system 3 using the tablet computer 2.

When the manipulation for controlling the automated system 3 by the operator is input from the display unit 201 of the tablet computer 2 or the input/output unit 202 thereof, the manipulation unit 204 of the tablet computer 2 accepts the manipulation. Subsequently, the manipulation unit 204 notifies the operation control unit 108 of the cradle 1 of the manipulation information which indicates the accepted manipulation via the control unit 206.

In Step ST910, the operation control unit 108 determines whether or not the operation control unit 108 has received the manipulation information, i.e., the control of the automated system 3 is performed by manipulating the tablet computer 2 by the operator.

In the case where the operation control unit 108 has not received the manipulation information in Step ST910 (in the case of "NO" in Step ST910), the process in Step ST910 is repeated. That is, the operation control unit 108 waits until the tablet computer 2 is manipulated by the operator and the operation control unit 108 is notified of the manipulation information from the manipulation unit 204.

In the case where the operation control unit 108 has received the manipulation information in Step ST910 (in the case of "YES" in Step ST910), the operation control unit 108 notifies the manipulation instruction unit 109 of the received manipulation information, and the manipulation instruction unit 109 notifies the control unit 301 of the machine of the automated system 3 of the manipulation information via the connectors 131 and 303 (Step ST911).

In the machine of the automated system 3, the control unit 301 performs control on the various applications 302 in accordance with the manipulation information. With this, it becomes possible to perform the control of the automated system 3 corresponding to the manipulation input to the tablet computer 2 by the operator.

The power reception unit 111 determines whether or not the connection flag to the tablet computer 2 or the connection flag to the automated system 3 is tuned OFF (Step ST912).

In the case where the connection flag to the tablet computer 2 or the connection flag to the automated system 3 is turned OFF in Step ST912 (in the case of "YES" in Step ST912), i.e., in the case where the connection between the cradle 1 and the tablet computer 2 or the connection between the cradle 1 and the automated system 3 is disconnected, an operation stop process is performed (Step ST913). Specifically, the power reception unit 111 stops the power supply to the cradle 1. In addition, the operation control unit 108 may be designed as follows: in the case where the connection between the cradle 1 and the automated system 3 is disconnected in the state in which the cradle 1 and the tablet computer 2 are connected, in response to the power supply stop, the operation control unit 108 makes the display unit 201 of the tablet computer 2 perform control of displaying information which indicates the disconnection of the connection to the automated system 3 via the USB connectors 121 and 203. In the case where the tablet computer 2 has the input/output unit 202, the operation control unit 108 may make the input/output unit 202 perform control of outputting the sound indicating that the connection to the automated system 3 is disconnected.

Note that, herein, it is determined whether or not the connection flag between the tablet computer 2 and the cradle 1 is turned ON (Step ST905) after the attachment of the tablet computer 2 to the cradle 1 is detected (Step T903), but the invention is not limited thereto, and it may be detected whether or not the tablet computer 2 is attached to the cradle 1 after it is determined whether or not the connection flag between the tablet computer 2 and the cradle 1 is turned ON.

In addition, it is possible for the operator to stop the operation of the automated system 3 at any time by pressing the emergency stop switch 101 of the cradle 1 without requiring the pressing of the enabling switch 103.

Figure 10:
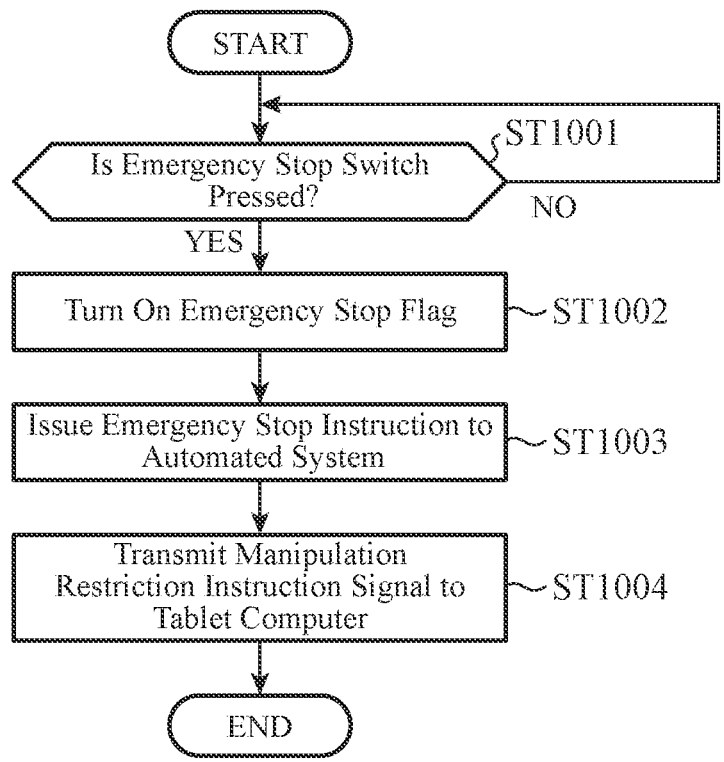
FIG. 10 is a flowchart for explaining an operation of the cradle in the case where an emergency stop instruction of the automated system by the operator is issued in the Embodiment 1.

FIG. 10 is a flowchart for explaining the operation of the cradle 1 in the case where the emergency stop instruction of the automated system 3 is issued based on the operator's manipulation in the Embodiment 1.

The emergency stop detection unit 110 of the cradle 1 detects whether or not the emergency stop switch 101 is pressed by the operator (Step ST1001). That is, the emergency stop detection unit 110 detects whether or not the emergency stop instruction of the operation of the automated system 3 is issued based on the operator's manipulation.

In the case where the emergency stop detection unit 110 does not detect the pressing of the emergency stop switch 101 in Step ST1001 (in the case of "NO" in Step ST1001), the emergency stop detection unit 110 repeats the process in Step ST1001, and waits for the emergency stop instruction.

In the case where the emergency stop detection unit 110 detects the pressing of the emergency stop switch 101 in Step ST1001 (in the case of "YES" in Step ST1001), the emergency stop detection unit 110 notifies the operation control unit 108 of the detection of the emergency stop instruction. Specifically, for example, the cradle 1 holds an emergency stop flag internally and, when the emergency stop detection unit 110 detects the pressing of the emergency stop switch 101, the emergency stop detection unit 110 notifies the operation control unit 108 of the detection of the emergency stop instruction by turning ON the emergency stop flag (Step ST1002).

When the emergency stop flag is turned ON in Step ST1002, the operation control unit 108 detects turning ON of the emergency stop flag, and transmits the manipulation information that instructs the manipulation instruction unit 109 to emergently stop the automated system 3. The manipulation instruction unit 109 notifies the control unit 301 of the machine of the automated system 3 of the manipulation information that issues the instruction to emergently stop the operation via the connectors 131 and 303 (Step ST1003).

In addition, the operation control unit 108 transmits the manipulation restriction instruction signal to the control unit 206 of the tablet computer 2 via the USB connectors 121 and 203 (Step ST1004). With this, the control unit 206 of the tablet computer 2 controls the display unit 201 to prohibit the manipulation by the tablet computer 2. In addition, at this point, the operation control unit 108 may be designed to make the control unit 206 of the tablet computer 2 perform control of displaying a message indicating that the automated system 3 is forcibly stopped on the display unit 201, and also make the control unit 206 of the tablet computer 2 perform control of outputting a sound indicating that the automated system 3 is forcibly stopped from the input/output unit 202 in the case where the tablet computer 2 has the input/output unit 202.

Note that, when the manipulation restriction instruction signal is transmitted, the operation control unit 108 turns ON the manipulation restriction flag that is held internally by the cradle 1.

Note that, herein, in the case where the emergency stop instruction is issued, the manipulation on the tablet computer 2 is prohibited, and the tablet computer 2 is controlled to display the information or output the sound indicating the emergency stop of the automated system 3 (Step ST1004), but any of the above processes may not be performed.

As described above, since the emergency stop switch 101 is provided in the cradle 1 and the manipulation of the emergency stop does not require the pressing of the enabling switch 103, it is possible to quickly stop the machine of the automated system 3 even when an unexpected situation occurs.

The emergency stop flag is turned ON in Step ST1002. This flag is set to be turned OFF after the automated system 3 is emergently stopped, e.g., in the initialization when the operation is resumed.

Thus, according to the Embodiment 1, it is possible to improve communication reliability, prevent a situation in which the automated system 3 does not operate even when the manipulation is performed, and prevent a decrease in productivity. In addition, the touch panel manipulation of the terminal device (tablet computer 2) is available only when the enabling switch 103 is pressed and the manipulation restriction release is accepted, and hence it is possible to accept only an intentional manipulation and eliminate a careless manipulation, malfunction, or the like. Further, even in the case where the operator drops the terminal device by mistake or an unexpected trouble happens to the operator so that it becomes impossible to use the terminal device suddenly, a careless input can be prevented and it is possible to eliminate the malfunction.

The grip shape of the cradle 1 is formed to fit the operator's hand, and hence it is possible for the operator to easily handle the cradle 1.

In addition, since the manipulation of the emergency stop does not require the pressing of the enabling switch 103, it is possible to quickly stop the machine of the automated system 3 even when an unexpected situation occurs.

Embodiment 2

In the Embodiment 1, the cradle 1 and the automated system 3 are connected by wire.

In the following, an Embodiment 2 in which the cradle 1 and the automated system 3 are wirelessly connected will be described.

Figure 11:
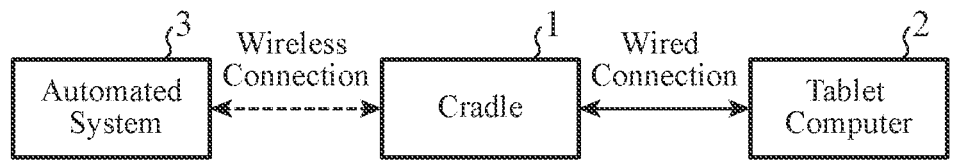
FIG. 11 is a view for explaining an outline of the system control by the tablet computer (terminal device) attached to the cradle according to an Embodiment 2 of the present invention.

FIG. 11 is a view for explaining an outline of the system control by the tablet computer 2 (terminal device) attached to the cradle 1 according to the Embodiment 2 of the present invention.

The system control is different from that explained with reference to FIG. 1 in the Embodiment 1 only in that the connection between the cradle 1 and the automated system 3 is wireless connection by a wireless communication system having high reliability.

Note that, by connecting the cradle 1 and the automated system 3 using the wireless connection by the wireless communication system having high reliability, it is possible to provide a communication environment having reliability higher than that of the wireless connection between a commercially available tablet computer and the automated system 3.

The other characteristics are the same as those of the control system explained with reference to FIG. 1, and hence the redundant description thereof will be omitted.

The outer appearance of the tablet computer 2 according to the Embodiment 2 is the same as that explained with reference to FIG. 2 in the Embodiment 1, and hence the redundant description thereof will be omitted.

The outer appearance of the cradle 1 according to the Embodiment 2 is different from that explained with reference to FIG. 3 in the Embodiment 1 only in that the cradle 1 does not have the connection cable 13, and hence the depiction and the redundant description thereof will be omitted.

Figure 12:
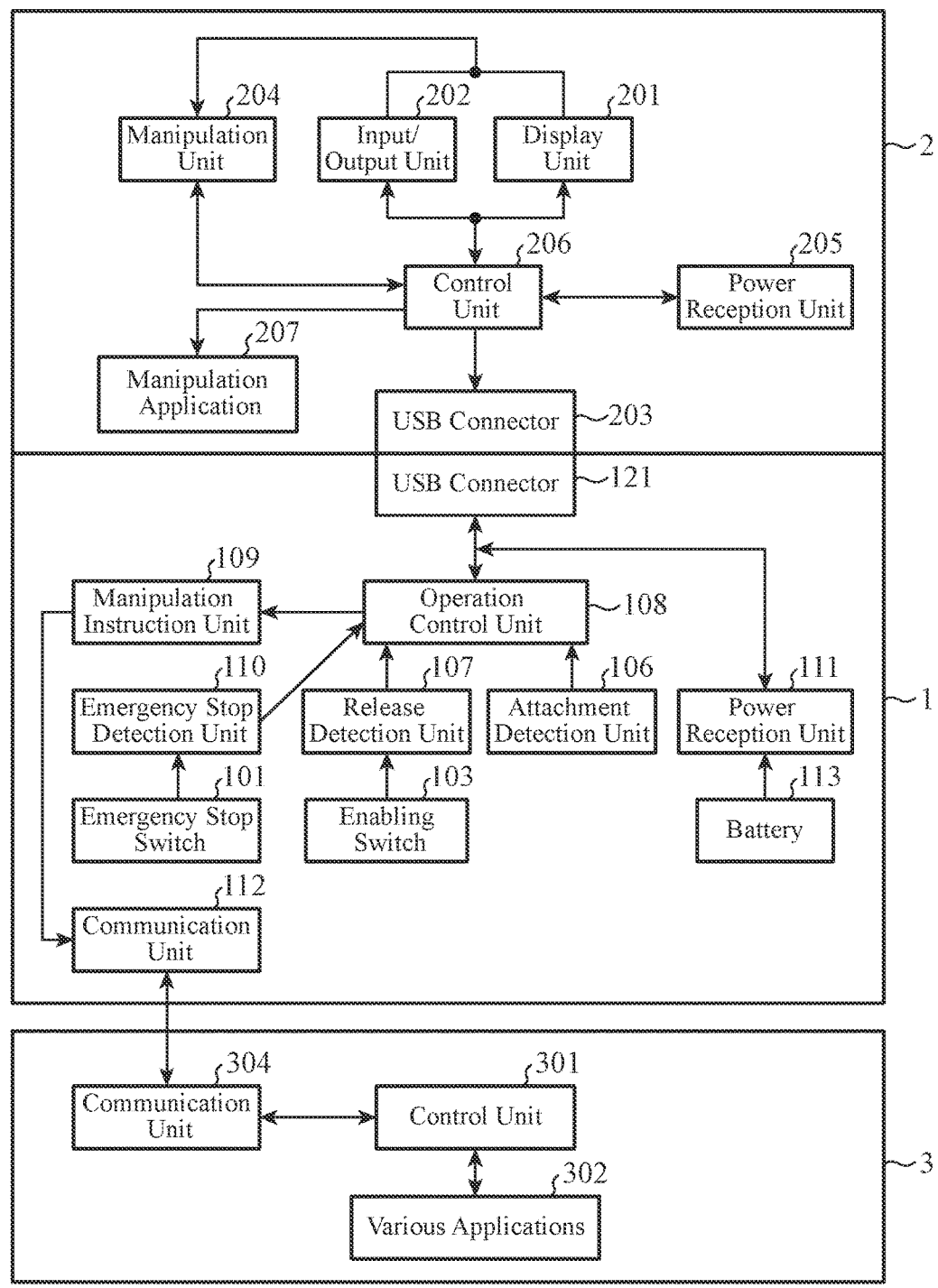
FIG. 12 is a view showing an example of an electrical configuration when the tablet computer and the cradle are connected via USB connectors, and the cradle and an automated system are wirelessly connected by a wireless communication system having high reliability in the Embodiment 2.

FIG. 12 is a view showing an example of the electrical configuration when the tablet computer 2 and the cradle 1 are connected via the USE connectors 121 and 203 and the cradle 1 and the automated system 3 are wirelessly connected by the wireless communication system having high reliability in the Embodiment 2.

The electrical configuration of each of the tablet computer 2 and the cradle 1 is the same as that explained with reference to FIG. 8 in the Embodiment 1, and hence the redundant description thereof will be omitted.

As shown in FIG. 12, the Embodiment 2 is different from the Embodiment 1 in that a rechargeable battery 113 that is accommodated in the cradle 1 so as to be replaceable is provided, and the power reception unit 111 receives power supply from the battery 113.

In addition, the Embodiment 2 is different from the Embodiment 1 in that the communication between the cradle 1 and the automated system 3 is performed not via the connectors 131 and 303 but via communication units 112 and 304.

The communication unit 112 of the cradle 1 establishes wireless communication between the communication unit 112 and the communication unit 304 of the automated system 3, and performs the wireless communication.

Note that a high-reliability wireless connection method is assumed to be used in the wireless communication between the cradle 1 and the automated system 3 in the Embodiment 2, and the high-reliability wireless connection method is realized by using a technique such as a specified low power radio communication whose radio wave reliability is higher than that of the wireless LAN, has low power consumption, and has small radio interference.

Thus, by adopting the wireless communication system having high reliability, it is possible to improve communication reliability.

In addition, in the Embodiment 2, as described above, the battery 113 is provided in the cradle 1, and the tablet computer 2 also receives the power supply from the battery 113, and hence the long use of the tablet computer 2 is allowed, and the possibility of occurrence of an unexpected shutdown or the like is decreased. From this point of view as well, it is possible to improve the communication reliability.

The operation of the cradle 1 in the Embodiment 2 is different from that in the Embodiment 1 only in that the communication between the cradle 1 and the automated system 3 is performed via the communication units 112 and 304 and it is determined whether or not the connection therebetween is established in accordance with whether or not the wireless communication using the communication units 112 and 304 is established, and the other operations are the same as those explained with reference to FIGS. 9 and 10 in the Embodiment 1, and hence the redundant description thereof will be omitted.

Thus, according to the Embodiment 2, similarly to the Embodiment 1, it is possible to improve the communication reliability, prevent the situation in which the automated system 3 does not operate even when the manipulation is performed, and prevent the decrease in productivity. In addition, since the touch panel manipulation of the terminal device (tablet computer 2) is available only when the release of the manipulation restriction is accepted in accordance with the pressing of the enabling switch 103, it is possible to accept only the intentional manipulation and eliminate a careless manipulation and a malfunction. In addition, even in the case where the operator drops the terminal device by mistake or an unexpected trouble happens to the operator so that it becomes impossible to use the terminal device suddenly, a careless input can be prevented and it is possible to eliminate the malfunction.

Further, the grip shape of the cradle 1 is formed to fit the operator's hand, and hence it is possible for the operator to easily handle the cradle 1.

In addition, since the manipulation of the emergency stop does not require the pressing of the enabling switch 103, it is possible to quickly stop the machine of the automated system 3 even when an unexpected situation occurs.

It is possible to freely combine the embodiments, modify any components of the embodiments, or omit any components in the embodiments within the scope of the invention of the present application.

The individual units used in the control of the cradle 1 in each of the Embodiments 1 and 2 are executed as program processing based on software by the CPU.

Note that, in the Embodiments 1 and 2 of the present invention, the cradle 1 has the configurations shown in FIGS. 8 and 12, respectively, and the cradle 1 can achieve the effects described above by including the USB connector 121, the terminal holding part 104, the attachment detection unit 106, the release detection unit 107, the operation control unit 108, and the manipulation instruction unit 109.

INDUSTRIAL APPLICABILITY

The cradle according to the invention is configured so as to be capable of performing the communication having high reliability and preventing the careless manipulation and the malfunction, and hence it is possible to apply the present invention to the cradle to which the terminal device such as the tablet computer that monitors and controls a system is attached.

REFERENCE SIGNS LIST

1: cradle
2: tablet computer
3: automated system
12, 13: connection cable
100: housing
101: emergency stop switch
102: grip
103: enabling switch
104: terminal holding part
105: hole
106: attachment detection unit
107: release detection unit
108: operation control unit
109: manipulation instruction unit
110: emergency stop detection unit
111, 205: power reception unit
112, 304: communication unit
113: battery
121, 203: USB connector
131, 303: connector
201: display unit
202: input/output unit
204: manipulation unit
206, 301: control unit
207: manipulation application
302: various applications

The invention claimed is:

1. A cradle used with a terminal device by being connected to the terminal device via a connector provided in the terminal device and being connected to an external automated system to communicate with each other, the cradle comprising:
a connector connectable to the connector provided in the terminal device;
a terminal holding part to hold the terminal device;
an attachment detector to detect that the terminal device is attached to the terminal holding part;
a release detector to detect a release instruction to release manipulation acceptance prohibition of the terminal device;
an operation controller programmed to,
when the attachment detector detects the attachment of the terminal device, make the terminal device prohibit manipulation acceptance in response to establishment of connection between the connector of the cradle and the connector provided in the terminal device, and
when the release detector detects the release instruction while the terminal device is still attached, make the terminal device release the prohibition of the manipulation acceptance while the terminal device is attached; and accept, from the terminal device, control information for controlling the external automated system, the control information being entered via manipulation of the terminal device while the terminal device is attached; and a manipulation instructor to transmit to the automated system the control information accepted by the operation controller.

2. The cradle according to claim 1, further comprising an emergency stop detector to detect an emergency stop instruction of the automated system, wherein when the emergency stop detector detects the emergency stop instruction, the operation controller transmits control information for stopping an operation of the automated system to the manipulation instructor irrespective of whether or not the prohibition of the manipulation acceptance is released by the terminal device, and the manipulation instructor transmits to the automated system the control information for stopping the operation of the automated system.

3. The cradle according to claim 1, wherein the cradle is connected to the automated system via a connector of the automated system.

4. The cradle according to claim 1, wherein the cradle is connected to the automated system by wireless communication.

5. The cradle according to claim 1, further comprising an enabling switch enabling a user to input the release instruction, wherein the release detector detects the release instruction input via the enabling switch.

6. A cradle used with a terminal device by being connected to the terminal device via a connector provided in the terminal device, the cradle comprising a connector connectable to the connector provided in the terminal device;

a terminal holding part to hold the terminal device;

an attachment detector to detect that the terminal device is attached to the terminal holding part;

a release detector to detect a release instruction to release manipulation acceptance prohibition of the terminal device;

an operation controller to make, when the attachment detector detects the attachment of the terminal device, the terminal device prohibit manipulation acceptance in response to establishment of connection between the connector of the cradle and the connector provided in the terminal device, and when the release detector detects the release instruction, make the terminal device release the prohibition of the manipulation acceptance such that the operation controller accepts manipulation information for controlling an automated system from the terminal device;

a manipulation instructor to notify the automated system of the manipulation information accepted by the operation controller; and a grip for holding the cradle, wherein a cross-sectional shape of the grip is a square 50 mm on a side.

7. The cradle according to claim 6, wherein a length of the grip is set such that the terminal device is fixed to the cradle at a position where, when the grip of the cradle to which the terminal device is attached is gripped such that the terminal device is horizontally positioned, the center of gravity of the terminal device is aligned in a vertical direction with a center of a palm of an operator who grips the grip.

8. A terminal device control method using a cradle used with the terminal device by being connected to the terminal device via a connector in the terminal device, the cradle having a connector connectable to the connector provided in the terminal device and being connected to an external automated system to communicate with each other, the terminal device control method comprising the steps of:

detecting that the terminal device is attached to the cradle;

detecting a release instruction to release manipulation prohibition of the terminal device;

by an operation controller, when the attachment of the terminal device is detected by the attachment detection unit, making the terminal device prohibit manipulation acceptance in response to establishment of connection between the connector of the cradle and the connector provided in the terminal device, and when the release instruction is detected while the terminal device is still attached, making the terminal device release the prohibition of the manipulation acceptance while the terminal device is attached; and accepting, from the terminal device, control information for controlling the external automated system, the control information being entered via manipulation of the terminal device while the terminal device is attached; and by the cradle, transmitting to the automated system the control information.

9. The terminal device control method according to claim 8, wherein the release instruction is input via an enabling switch provided on the cradle.

* * * * *